March 31, 1959 R. R. TWOGOOD 2,879,572
TURNBUTTON FASTENER
Filed Aug. 24, 1955
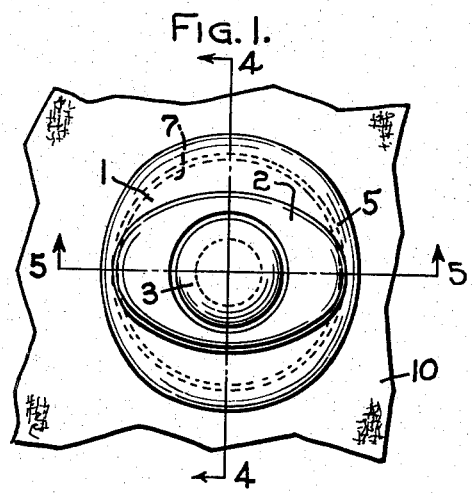
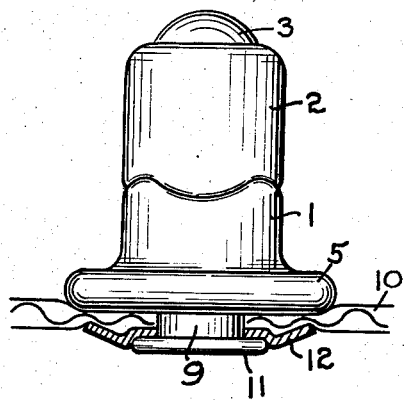
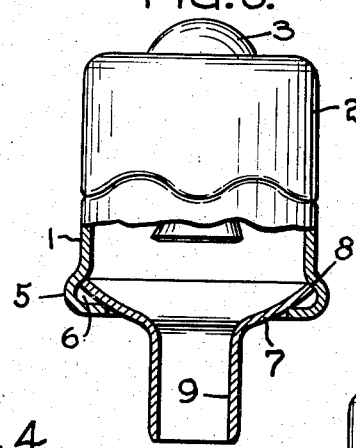
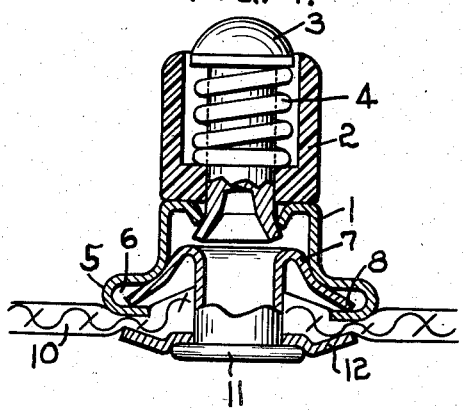
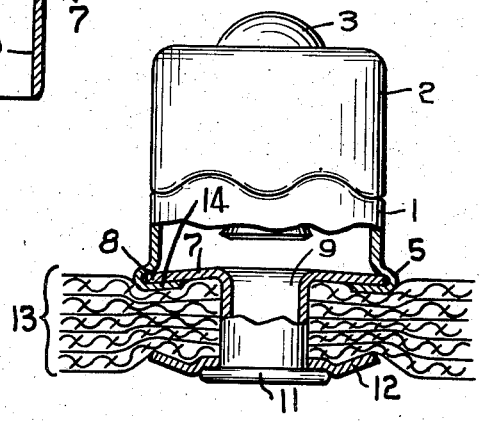
INVENTOR:
ROBERT R. TWOGOOD,
BY Walter P. Jones
ATTORNEY.

United States Patent Office 2,879,572
Patented Mar. 31, 1959

2,879,572

TURNBUTTON FASTENER

Robert R. Twogood, Lexington, Mass., assignor to United-Carr Fastener Corporation, Boston, Mass., a corporation of Delaware Application August 24, 1955, Serial No. 530,321

2 Claims. (Cl. 24—221)

My invention relates to so-called turnbutton fasteners and more particularly to improvements in the turnbutton member of the fastener and to the means for fastening that member to a support.

A primary object of my invention is to provide the turnbutton part with an attaching member assembled therewith and having a concavo-convex flange and a barrel portion extending from the flange beyond the turnbutton base.

Another object of the invention is to provide the base part of the turnbutton with a hollow bead having a greater space than the thickness of the edge of the flange of the attaching member to permit collapsing of the flange and also of the bead.

Still further advantages of my invention will appear from the following specification, a preferred embodiment being shown by the accompanying drawing in which:

Fig. 1 is a plan view of my improved turnbutton member as it appears when attached to a support;

Fig. 2 is a side view of my improved fastener, the support and attaching washer being shown in cross section;

Fig. 3 is a side view of the turnbutton member, the lower portion being shown in cross section;

Fig. 4 is a section taken on the line 4—4 of Fig. 1, portions being left in elevation; and Fig. 5 is a partial section taken on the line 5—5 of Fig. 1.

Referring now to the specific disclosure of my invention, as illustrated by the drawing, I have shown a turnbutton member of a fastener, the other part being any well-known type of grommet, not shown.

While my invention may be used with different constructions of turnbuttons, I have illustrated it in connection with a well-known commercial type. This turnbutton includes a hollow base member 1, a button member 2 rotatably attached to the base by a rivet 3, and a spring 4 as best shown in Fig. 4.

This type of turnbutton heretofore has been attached to a support by prongs extending from the base or from a screw depending upon whether the support is flexible or rigid. In many cases it is desirable to attach turnbutton members of this type by automatic or foot power operated equipment in which case the attaching element should be of such a nature that it will self-pierce leather, cloth and the like.

It is also desirable to provide a given length attaching element that will adjust itself to various thicknesses of materials. To accomplish these results I have provided the base member 1 with an annular bead 5 at its lower edge and providing a groove 6. Into this groove is assembled an attaching member having concavo-convex flange 7 (Fig. 3) with its edge 8 fitting into the groove 6. The attaching member also has a hollow barrel preferably extending from the center of the flange 7 in a direction away from and beyond one end of the base 1.

In the drawing my invention is clearly shown in Figs. 3, 4, and 5. In Fig. 3 the base and eyelet are shown in cross section to illustrate the normal relation of the parts. It is clear that the edge 8 of the concavo-convex flange 7 fits easily within the groove 6.

When the fastener member is attached to a single thickness of thin material 10 (such as cloth) the end portion 11 of the barrel 9 is curled over a washer 12 by suitable attaching tools (not shown). During this attaching and curling operation pressure is first exerted upon the end of the barrel 9 as will be understood by those skilled in the art, and as a result the flange 7 cooperates with the annular bead 5 of the base 1 to brake the movement of the bead 5 when axial attaching forces are applied. After the axial forces increase, a portion of the walls of the base collapse inwardly (see Fig. 4) to prevent the edge 8 of the flange 7 from slipping past the walls of the base 1. Since the lateral forces are driving the barrel 9 toward the spring elements 3 and 4 and the flange 7 is being held from lateral movement by cooperation of the edge 8 and the walls of the groove 6, a levering action takes place and the edge 8 moves along the walls of the groove 6 toward the barrel 9. This action is helped considerably by the collapse of the walls of the base 1. When the edge 8 reaches the wall of the groove 6 closest to the end portion 11 of the barrel 9, the flange 7 locks in place arresting the lateral movement of the barrel 9 as clearly shown in Fig. 4. At the beginning of the application of axial force to the barrel 9, the concave portion of the flange 7 faces substantially toward the axis of the barrel 9 (see Fig. 3) when the lateral movement of the barrel 9 is completely arrested, as explained heretofore, the concave portion of the flange 7 faces substantially away from the axis of the barrel 9 (see Fig. 4). The barrel 9, however, does not contact the upset end of the rivet 3 in this minimum thickness attachment. Therefore there is no interference with the normal rotary operation of the button member 2 relative to the base 1.

If it is desired to attach this fastener part to a much thicker support 13, as shown in Fig. 5, the same attaching tools may be used and no change is necessary in the length of the barrel 9. In this case the flange 7 does not collapse as much as in the thinner material, and the barrel length does not change to any extent, while the curled end 11 is about the same in both instances.

It will be readily apparent to those skilled in the art that this improved attaching construction is important to the manufacture of the device as well as to the user because one given length of eyelet barrel will take care of many thicknesses of applications. The whole problem is much more simple than supplying fasteners with different length attaching elements or different thicknesses of materials.

In order to permit the greatest amount of variation of thicknesses of applications with a given length of barrel, the bead 5 has a groove 6 that presents a space of greater dimensions than the thickness of the edge 8 of the flange 7 (Figs. 3 and 4).

Thus, in thick applications the bead 5 may be squeezed to grip both sides of the edge 8 of the flange 7 thereby allowing for more thickness of material between the inturned portion 14 of the base 1 and the washer 12 as best illustrated in Fig. 5.

While I have illustrated and described a particular embodiment of my invention, I do not wish to be limited thereby because my invention is best defined by the following claims.

I claim:

1. A turnbutton type fastener member comprising in combination a base part, and an attaching member assembled with said base part, said base part having a hollow beaded rim portion, and said attaching member having a thin concavo-convex shaped flange with its edge located within the hollow bead for assembly with the base part and also having a barrel portion extending from the center of the flange away from the base part, the concavo-convex shape of said flange providing for adjustment of the barrel portion when being riveted to attach the fastener member to a support, the hollow bead of the base part having a space receiving the edge of the attaching member and said space being greater than the thickness of the said edge and the walls of said space cooperating with the edges of the said flange during the riveting operation of the barrel to turn the concave portion of the said flange from facing substantially toward the axis of said barrel to facing substantially away from the axis of said barrel.

2. A turnbutton type fastener member comprising in combination a base part, a turnbutton part rotatably mounted on said base part, and an attaching member assembled with said base part, said base part having a hollow beaded rim portion and said attaching member having a thin concavo-convex shaped flange with its edge located within the hollow bead for assembly with the base part and also having a barrel portion extending from the center of the flange away from the base part, the concavo-convex shape of said flange providing for adjustment of the barrel portion when being riveted to attach the fastener member to a support, the hollow bead of the base part having a space receiving the edge of the attaching member and the chord of said space being greater than the thickness of the said edge to aid in changing the direction of facing of the concave portion of said flange from toward the axis of the barrel portion to a direction facing way from the barrel portion during the riveting operation of the barrel, said hollow bead also being collapsible to add effective length to the barrel portion when the fastener member is attached to extra thick supporting structures and to aid in turning the facing direction of the concave portion of said flange.

References Cited in the file of this patent

UNITED STATES PATENTS

| | | |
|---|---|---|
| 573,401 | Sappey | Dec. 15, 1896 |
| 739,677 | Hyde | Sept. 22, 1903 |
| 1,170,092 | Murphy | Feb. 1, 1916 |
| 2,627,098 | Van Buren | Feb. 3, 1953 |